Oct. 7, 1958 — H. W. BOTELER — 2,855,176
DIAPHRAGM VALVES
Filed April 28, 1954 — 4 Sheets-Sheet 1
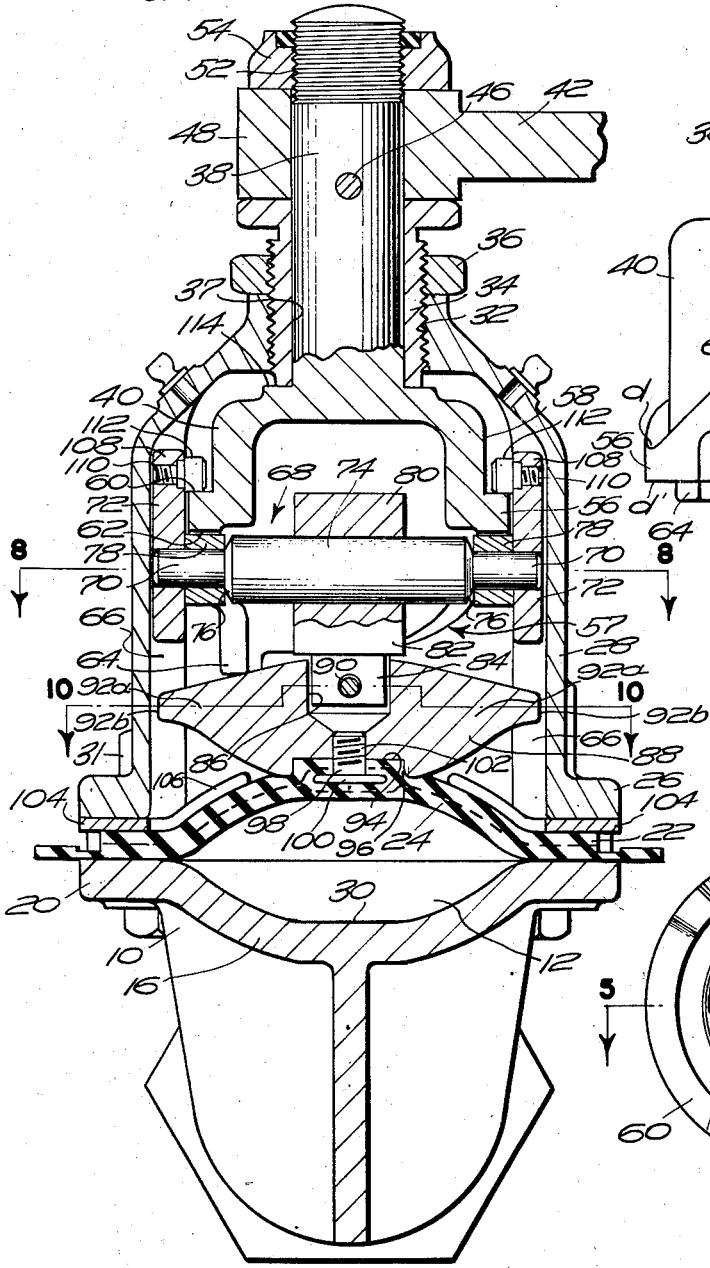
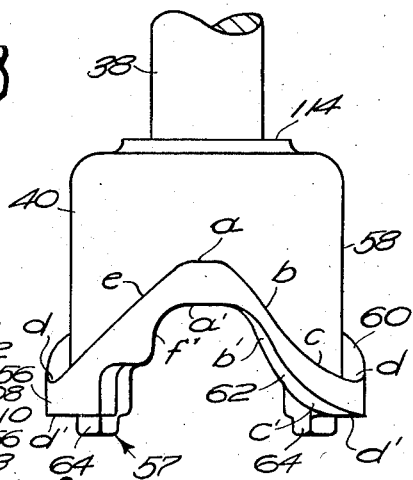
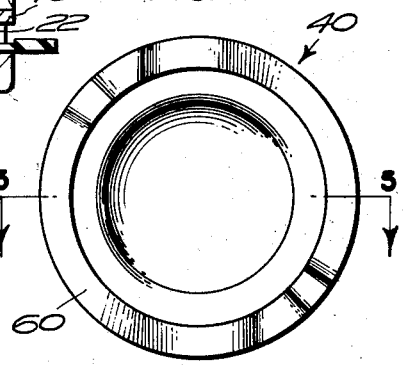
INVENTOR.
HENRY W. BOTELER
BY
*David D. McKenney*
ATTORNEY

Oct. 7, 1958   H. W. BOTELER   2,855,176
DIAPHRAGM VALVES
Filed April 28, 1954   4 Sheets-Sheet 2
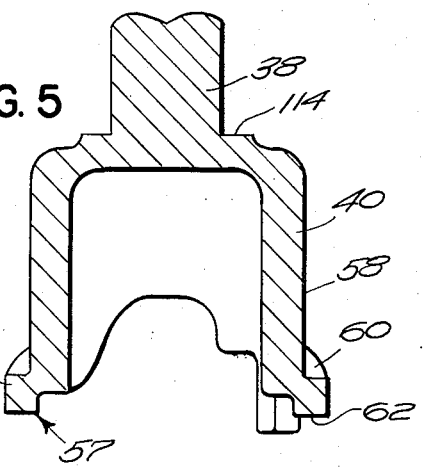
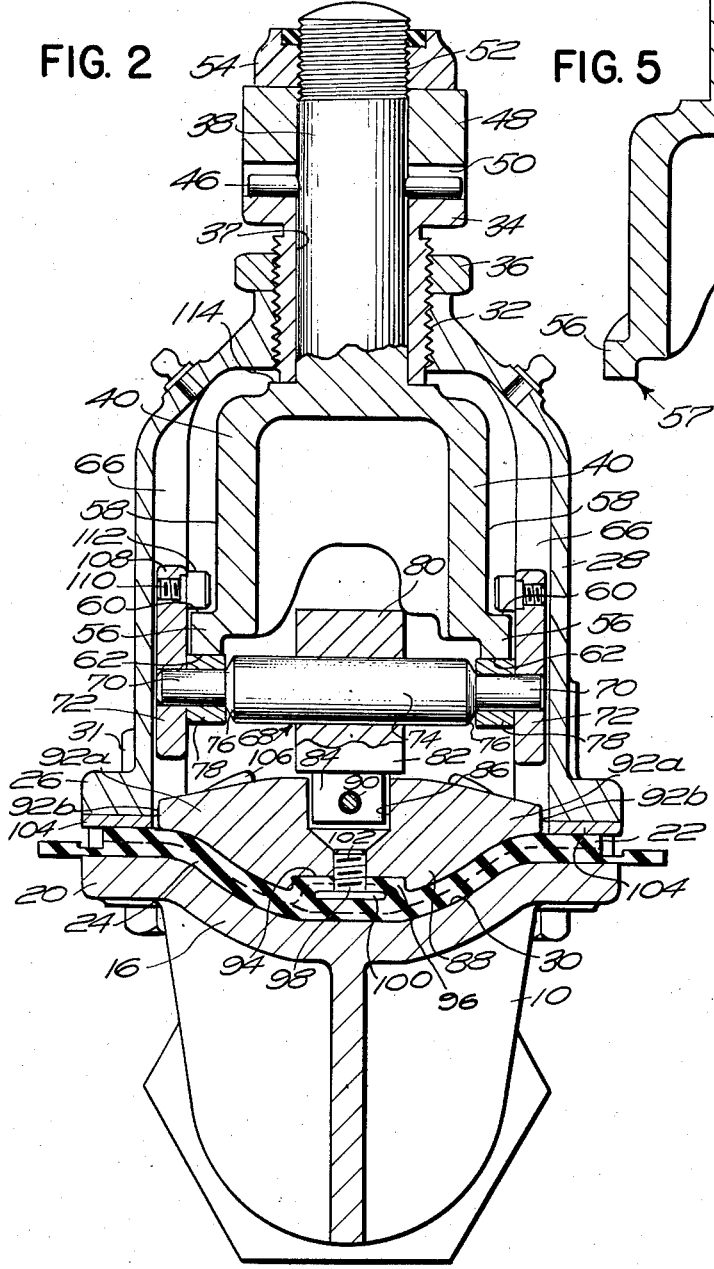
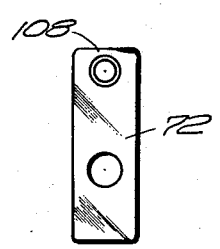
*INVENTOR.*
HENRY W. BOTELER
BY
*David D. McKenney*
ATTORNEY

Oct. 7, 1958 — H. W. BOTELER — 2,855,176
DIAPHRAGM VALVES
Filed April 28, 1954 — 4 Sheets-Sheet 3

INVENTOR.
HENRY W. BOTELER
BY
*David D. McKenney*
ATTORNEY

Oct. 7, 1958 H. W. BOTELER 2,855,176
DIAPHRAGM VALVES
Filed April 28, 1954 4 Sheets-Sheet 4
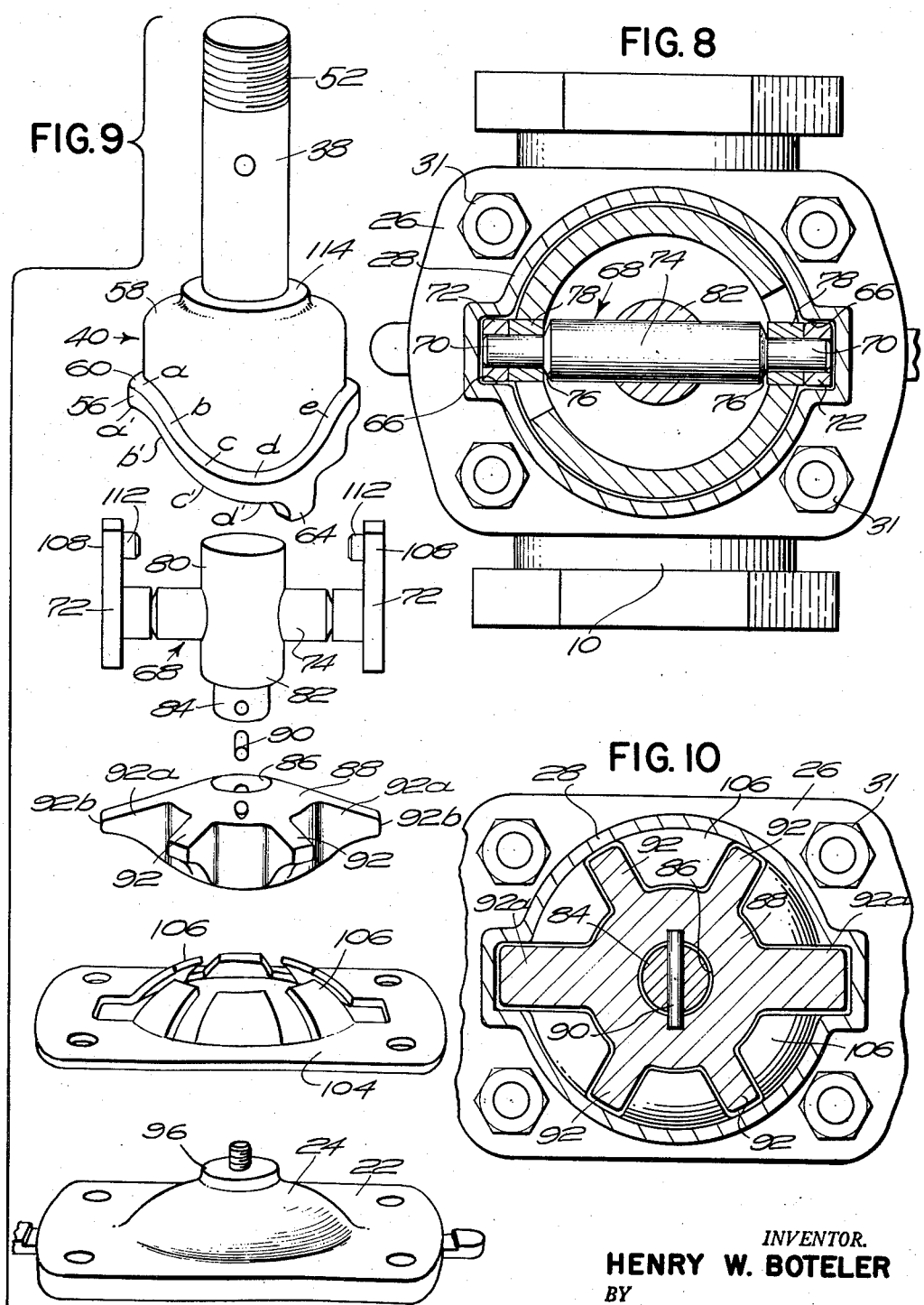
INVENTOR.
HENRY W. BOTELER
BY
David D. McKenney
ATTORNEY

# United States Patent Office 2,855,176
Patented Oct. 7, 1958

2,855,176
DIAPHRAGM VALVES

Henry W. Boteler, East Greenwich, R. I., assignor to Grinnell Corporation, Providence, R. I., a corporation of Delaware Application April 28, 1954, Serial No. 426,155

9 Claims. (Cl. 251—252)

This invention relates to improvements in diaphragm valves and is directed particularly to improvements in actuating mechanisms therefor of the type in which opening and closing movement of the diaphragm is effected by rotation of a member extending outside the valve bonnet.

In general each of the diaphragm valves to which the present invention relates has a body with an opening in the side thereof and a substantially straight passage therethrough which communicates with said opening and is intersected by a transverse weir opposite thereto. The diaphragm has its periphery clamped between the rim of the opening and the bonnet in which the actuating mechanism is housed, and the weir is formed with a seat against which the actuating mechanism presses the diaphragm to close the valve. To open the valve the actuating mechanism withdraws the diaphragm from the weir seat.

One actuating mechanism element common to nearly all diaphragm valves of this kind is the so-called compressor which lies adjacent the diaphragm on the side thereof opposite the weir and is moved toward and away from the latter to effect closing and opening of the valve. The remaining actuating elements provided within the bonnet to produce such motion of the compressor have involved a variety of arrangements, probably the most common of which is that wherein rotative movement of an element extending outside the bonnet is transformed by intermediate elements into opening and closing movement of the compressor. An example of such an arrangement is the diaphragm valve manually operated by a handwheel.

It frequently happens that the use to which a diaphragm valve is put requires that it be capable of being opened and closed very quickly. In such valves, where it is desired to use that kind of actuating mechanism which has a rotatable element extending from the bonnet, this quick operation is normally achieved by arranging the mechanism so that movement of the compressor from the open position of the valve to its closed position is accomplished by a limited rotation of the extending element. The present invention is an improved arrangement of actuating mechanism elements to permit quick operation by such small rotative movement.

One difficulty with certain of the quick-acting valves of this type heretofore used has been that because the ratio of angular rotation of the extending element to movement of the compressor is small considerable force has been necessary to turn the extending element.

Another feature of certain of the quick-acting valves of this type previously known which is unsatisfactory is that opening movement of the compressor has been dependent upon spring elements so adapted that their deflection has been accomplished by the same force which produces closing movement thus increasing the force required to produce such movement.

Also in prior quick-acting valves of this type considerable resistance to movement of the elements has been observed arising from friction between the same, the overcoming of which friction has required additional forces and careful attention to lubrication.

Further it has been noted that in earlier quick-acting valves of this type the cam surfaces of certain elements employed to transform rotative movement into linear movement have been so located on these elements as to require that they be formed by expensive machining operations.

In addition certain of the quick-acting valves of this type heretofore used have failed to take into account the nonuniformity of resistance to movement afforded by the diaphragm in its travels between open and closed positions.

Also, certain known valves of this type have not included provision for varying the extreme open and extreme closed positions of the compressor relative to the valve seat.

In general one form of valve embodying those improvements of the present invention with which the above recited deficiencies are overcome comprises a cylindrical bonnet of the usual construction for diaphragm valves having an opening which is remote from the opening in the body and which is disposed so that its axis coincides with that of the body opening. Located within this bonnet is a cylindrical member having at one end of an integral axial necked portion which extends out of the bonnet through the opening therein to receive a lever by which this cylindrical member may be turned. At its other end the cylindrical member is provided with flanges which extend radially of the outer surface of the member and thereby form a pair of cam surfaces. A compressor of standard design may be employed with the center of the diaphragm secured thereto in the usual fashion with arms adjacent the ends of the weir extending into longitudinal grooves in the opposite sides of the bonnet. On the side of the compressor opposite the diaphragm there is secured one end of a spindle which carries a cam following pin at its other end disposed at right angles to the spindle axis and having its ends extending across the cam flanges of the cylindrical member. Rollers provided on these extending portions of the pin are adapted to be engaged by one of the cam flange surfaces. The extreme ends of the pin are each provided with a block slidably mounted in one of the longitudinal bonnet grooves, and a portion of each such block overlies and engages the other cam surface.

Another form of valve embodying improvements of the present invention employs a cylindrical member without a flange, having instead a single cam surface. In this embodiment the pin ends lie in the bonnet grooves so as to be movable slidably therealong, but carry no blocks.

Still another form of valve embodying improvements of the present invention employs a cam following pin without rollers, the pin itself being directly engaged by the cam surface.

The structures of the present invention, thus generally described, have as their broad objective the overcoming of some or all of the earlier-stated deficiencies of known valves of this character, and accordingly, it is one object of the present invention to provide a quick-acting diaphragm valve in which the force required to effect valve operation by rotation of the lever is kept small through the employment of a cylindrical member having cams thereon spaced a substantial distance radially outward from the axis of rotation.

Another object of one embodiment of the present invention is to provide a valve of the described type in which opening thereof is positively effected by cam action, rather than by spring elements.

Another object of one embodiment of the present invention is to provide a valve of the described type in which the forces required merely to overcome friction during valve operation is kept at a minimum by the use of rollers on the cam following pin which engage the cam surface.

Still another object of the invention is to provide a valve of the described type in which the cam surfaces are integral with the cylindrical member and are so disposed thereon that their formation does not require machining of this member.

Still another object of the invention is to provide a valve of the described type in which the cam surfaces of the cylindrical member are shaped to afford the maximum mechanical advantage in closing at the portion of closing movement where the diaphragm offers the maximum resistance to such movement.

And yet another object of the invention is to provide a valve of the described type in which the extreme open and extreme closed positions of the compressor may be varied relative to the valve seat.

Other objects and features of advantages of the invention will be appreciated as the description herein develops.

The best mode in which it has been contemplated applying the principles of the present invention are shown in the accompanying drawings but the latter are to be deemed merely illustrative because it is intended that the patent shall cover by suitable expression in the appended claims whatever features of patentable novelty exist in the invention disclosed.

In the drawings:

Figure 1 is a sectioned end elevation view of a valve embodying improvements of the present invention, the valve being shown in its extreme open position;

Figure 2 is a view similar to that of Fig. 1, but showing the valve in its closed position;

Figure 3 is an elevation view of the end of the cylindrical member which carries the cams;

Figure 4 is a plan view of the cylindrical member looking toward the end thereof which carries the cams;

Figure 5 is a sectioned view of the portion of the cylindrical member shown in Fig. 3;

Figure 7 is an elevation view of one of the blocks located in the bonnet grooves;

Figure 8 is a plan view taken as on line 8—8 of Fig. 1;

Figure 9 is an exploded perspective view of certain elements of the valve shown in Fig. 1;

Figure 10 is a plan view taken as on line 10—10 of Fig. 1;

Figure 11:
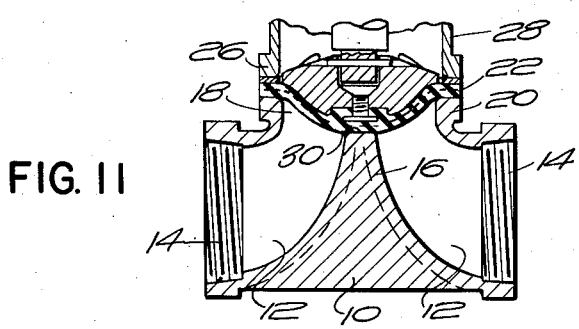
Figure 11 is a fragmentary side elevation view of portions of the valve of Fig. 2 showing how the diaphragm seats on the weir.

Referring now more particularly to the drawings, the numeral 10 designates the body of the valve. This body has a passage 12 therethrough and is provided at the ends of this passage with means for connecting the body between sections of fluid conducting pipe (not shown), for example, internal thread means 14 (see Fig. 11). The passage 12 is intersected by a weir 16 which is formed as an integral part of the body 10 and extends into the passage from one side thereof. The distance this weir so extends into the passage is a matter of choice, and though in the valves shown in the drawings this distance is substantial, it will be understood that the novel structure herein described may be employed in valves having weirs which extend into their passages to a greater or lesser degree or in valves having no weirs at all.

Opposite the weir 16 the body 10 is provided with an opening 18 which communicates with the passage 12 and has a flange 20 about its rim. Across the body opening there is disposed a diaphragm 22 preferably of rubber or rubber-like material and preformed with a bulge 24 in the center portion thereof extending away from the weir. The periphery of the diaphragm is clamped sealingly and securely between the body flange 20 and corresponding flange 26 on a housing or bonnet 28. This bonnet covers the body opening 18 and encloses a portion of the actuating mechanism.

The top surface 30 of the weir 16 is generally concaved (see Fig. 1) and has its ends merging smoothly into the flange 20 so as to form a seating for the diaphragm when the latter has its bulge 24 reversed and pressed firmly against this weir top (see Fig. 2).

The bonnet 28 is secured to the body by bolts 31 passing through the flanges 20 and 26 and through the portion of the diaphragm clamped therebetween, and from its flange 26 the bonnet extends away generally in the form of a cylinder. The end of the bonnet remote from the body is substantially closed except for a threaded opening 32 which is opposite the body opening and has its axis substantially in alignment with the axis thereof.

A hollow, exteriorly threaded bushing 34 is located in this threaded bonnet opening 32 so as to project somewhat outward thereof and is provided with a lock nut 36 on its threaded projecting portion. This lock nut when turned down firmly against the bonnet at the outer end of the opening 32 holds the bushing in place in this bonnet opening.

A central opening 37 in the bushing 34 serves as a journal for the stem 38 of a cylindrical member 40 located within the bonnet adjacent the end thereof which carries this bushing 34. The stem 38, preferably formed as an integral part of the cylindrical member 40 extends out of the bonnet through the bushing 34 and has secured to it a lever 42 by which it may be rotated. A satisfactory arrangement for so securing the lever to the stem is shown in the drawings wherein a pin 46 passing through the stem 38 has its ends extending outward therefrom across the upper end of the bushing 34. The lever is provided at one end with a hub portion 48 which encircles the stem adjacent the bushing and has grooves 50 to accommodate the extending ends of pin 46. Finally the end or the stem projecting from the lever hub 48 is threaded as at 52 to receive a lock nut 54. Thus, by the arrangement described, rotation of the lever 42 effects rotation of the stem and of the cylindrical member 40.

This cylindrical member 40 has its axis concentric with the axis of the stem and of the bonnet itself and is provided with a rib formation or flange 56 at its end 57 which is remote from the stem. This flange extends around the cylindrical member, radially outward from the outer surface 58 thereof so as to form a pair of cam tracks 60 and 62.

The end 57 of the cylindrical member and the flange 56 are so shaped that points on the cam tracks which are diametrically opposed lie in a line perpendicular to and passing through the cylindrical member's rotational axis. Otherwise described the end 57 of the cylindrical member is provided through substantially 105° with a pair of cam tracks defined by the opposite sides of flange and through the diametrically opposed 105° with an identical pair of cam tracks likewise defined by the flange sides.

Figure 6:
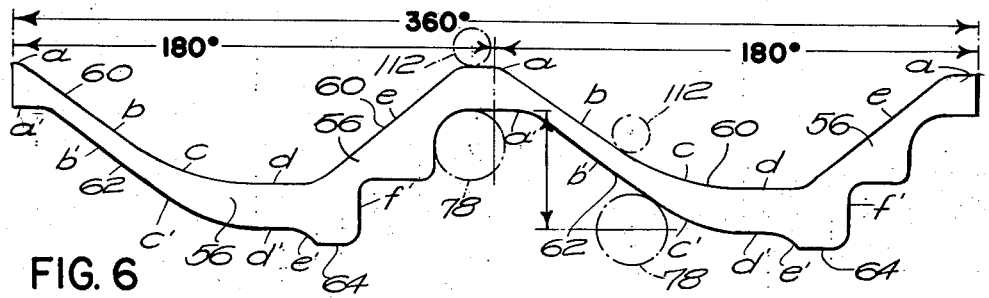
Figure 6 is a development of the cams carried by the end of the cylindrical member.

Figure 6 illustrates development of this flange 56. As shown, the top cam track 60 defined by the upper side of this flange has two high points a 180° apart. Proceeding around the cylindrical member in a clockwise direction, as viewed from the end of this member which carries the stem (that is, proceeding to the right in Fig. 6), the top cam track 60 descends from high point a along a substantially straight line b at an angle of approximately 40° and then gradually flattens out in region c to the short horizontal portion d. From this latter portion the upper side of the flange turns upward again along line e and merges with the other high point a. The inclined portion e is inactive in the operation of the valve and is not truly a part of the cam track 60.

The lower cam track 62, defined both by the lower side of the flange 56 and the end of the cylindrical member, has two high portions a' 180° apart which are located substantially vertically below the high points *a* of the upper cam track. These portions *a'* are horizontal, and again proceeding clockwise around the cylindrical member, the lower cam track inclines downwardly from each of these portions, as at *b'*, then gradually flattens out, as at *c'*, and merges wtih a horizontal portion *d'*. This latter horizontal portion again turns downward at *e'* and thereafter by a series of steps *f'* joins the other high portion *a'*. The downward turning portion *e'* forms a stop lug 64, the function of which will hereinafter appear.

The bonnet 28 is provided wtih diametrically opposed grooves 66 on its inner surface running longitudinally from the ends of the weir. A pin 68 disposed transversely across the bonnet adjacent the end 57 thereof has its ends 70 extending into these grooves. These pin ends 70 carry elongated blocks 72 slidably mounted in the grooves so as to be movable therealong (see Figs. 1, 2, 8 and 9), and the center portion 74 of the pin is of somewhat greater diameter than the pin ends 70 providing shoulders as at 76. The portion of each pin end 70 between the block 72 and the shoulder 76 is adjacent the lower cam track 62 and carries a roller 78 engaging this track.

The pin's enlarged center portion 74 is encircled by the upper end 80 of a spindle 82 axially aligned with cylindrical member 40 and having its end 80 extending part way thereinto. The lower end 84 of the spindle fits into the upper central recess 86 of a compressor 88 and is pivotally mounted therein by a pin 90 passing horizontally through this spindle end 84 and journaled in the compressor portion surrounding the recess 86. The pin 90 is disposed at right angles to the weir so that the compressor may rock slightly and align itself with respect to the weir during valve closure.

The compressor 88 is provided with spaced fingers 92 extending radially from the compressor's center portion (see Fig. 10), and two of these fingers 92*a* which lie above the weir are somewhat longer than the others so that the end 92*b* of each extends into one of the bonnet grooves 66 and is slidable longitudinally therein.

The undersides of the compressor fingers 92 are shaped in the contour of the side of the diaphragm opposite that which is pressed against the weir's concave top surface 30. The underside of the center portion of the compressor is provided with a recess 94 which receives a boss 96 on the diaphragm. A stud 98 has its head 100 embedded in this boss and its shank 102 extending therefrom into threaded engagement with the compressor at the bottom of the compressor recess 94.

A finger plate 104 is clamped between the bonnet and the diaphragm and has inwardly extending radial fingers 106 which fit between the compressor fingers 92. This finger plate supports the diaphragm against the forces resulting from pressure in passage 12 when the valve is in the open position (see Fig. 1).

From the description thus far it will be apparent that closing movement of the valve may be accomplished by clockwise rotation of the lever 42, starting from the open valve position of Fig. 1. In this open position the rollers 78 on the pin ends 70 are in engagement with the portions *a'* of the lower cam track 62. Clockwise rotation of the lever turns the cylindrical member 40 so as to present to these rollers the inclined portions *b'* of this lower cam track. Inasmuch as the pin 68 cannot rotate with the cylindrical member because its ends 70 carry the blocks 72 which are confined against such rotation in the bonnet grooves 66, the inclined portions *b'* of the lower cam track 62 drive the pin 68 downward and advance the compressor 88 toward the weir.

The resistance to this downward movement afforded by the diaphragm is not uniform throughout travel thereof from fully open position to fully closed position. Thus, at the beginning of the closing movement the least resistance is encountered, and, accordingly, the portion *b'* of the lower cam track 62 is the most steeply inclined.

Toward the end of the closing movement, however, the resistance to closing increases as some portions of the diaphragm come in contact with the weir and the remaining portions are being forced into similar contact by squeezing of the diaphragm material. At this point in the closing operation the inclination of the lower cam track becomes less steep, as at portion *c'*, and gradually merges into the horizontal portion *d'* at which portion the rollers 78 have been driven far enough downward to effect complete closing.

From this level of the rollers 78, when they are in engagement with lower cam surface portion *d'*, the compressor can move no farther toward the weir, and hence the downwardly turned portion *e'* serves to prohibit further rotation of the actuating mechanism elements.

To open the valve from its closed position the upper cam track 60 is employed in this embodiment. The blocks 72 mounted in the bonnet grooves 66 have their upper ends 108 extending above the flange 56 on the cylindrical member, and bolts 110 are secured into these upper ends with their head portions 112 overlying the upper cam track 60. By this arrangement when the lever is rotated counterclockwise each bolt head 112, positioned above an upper cam track portion *d* when the valve is closed, is engaged by the upper cam track portion *c* and urged upward. This upward motion is continued as further rotation causes upper cam track portions *b* to be presented to the bolt heads, and through the blocks 72, pin 68, spindle 82 and compressor 88 upward movement of the bolts 110 withdraws the diaphragm from its seat on the weir. When the bolt heads 112 arrive at the high positions *a* on the upper cam track the valve is fully open. Continued counterclockwise rotation of the lever after the valve is fully open is prevented by the rollers 78 abutting against the portion *f'* on the lower side of the flange 56 as shown in Fig. 6.

The juncture of the stem 38 with cylindrical member 40 forms a shoulder 114 which is held against the lower end of bushing 34 by tightening of lock nut 54. Inasmuch as the stroke of the longitudinally moving parts is fixed by the shape of the cam tracks and the cylindrical member 40 cannot move longitudinally in the bonnet, adjustment of the bushing 34 in the bonnet opening 32 establishes the extreme open and closed positions of the compressor. Accordingly, it is possible to locate the bushing 34 so that the diaphragm is squeezed just the proper amount when the lever is rotated to closed position. Lock nut 36 then may be turned to secure the bushing in this position.

The earlier stated objects of the invention are accomplished by these described structures. Thus, by employing the bonnet grooves 66 to prevent rotation of the pin 68, the cylindrical member 40 can be constructed so as to completely occupy the cylindrical interior of this bonnet and no portion of this interior is consumed by guiding means. As a consequence the cam tracks 60 and 62 are a maximum distance from the axis of rotation of the cylindrical member and have maximum length so that their inclined portions can have minimum steepness. This is advantageous because the less steep the inclined portions of the cam track the less are the forces exerted perpendicular to the cam track surfaces when the cam is turned against its follower, and since these perpendicular forces are responsible for a large portion of the frictional resistance to operation and wear their reduction is desirable. Adaptation of well known bonnets to the present invention may be simple and inexpensive for the reason that the grooves 66 have long been employed in such bonnets to guide the long compressor fingers 92*a*. It is well to note at this point that there has been reason for using bonnet grooves in the past to guide the long compressor fingers 92*a*, rather than some other form of guiding structure. That some such guiding structure was necessary is obvious when it is appreciated that in valves prior to this invention no means equivalent to the guided pin 64 herein described were employed to prevent rotation of the compressor and spindle upon rotation of the lever or handwheel. Accordingly, the compressor itself was customarily guided, and this guiding took the form of compressor fingers extending into bonnet grooves at the ends of the weir because positive diaphragm closure was required at these weir ends and further because it was desirable to maintain the area of the unclamped diaphragm center portion as small as possible. More specifically, it has been found necessary that the underside of the compressor engage the diaphragm at the regions where the weir ends blend into the body opening flange to assure tight closure there. This could be accomplished by having the edge of the diaphragm's unclamped center portion extend as far out as these regions all around its periphery and by providing a compressor adapted to overlie this entire center portion, but the difficulty with this arrangement would be that the area of the center portion would be substantially increased and greater force would be required to overcome a given line pressure in the valve during closing. Hence, it has been customary to extend the diaphragm's unclamped center portion only at the weir ends, for proper closure there by projecting compressor fingers, and the groove resulting in the bonnet to accommodate these fingers has been used to prevent rotative movement of the compressor and spindle. Appreciating the above, it will be understood that the use of projecting compressor fingers 92a and bonnet grooves 66 is necessary without regard to the prevention of rotation and that the employment of these same grooves to guide the pin 68 is novel and constitutes an important part of the present invention.

Employment of the outstanding flange 56 on the cylindrical member in one embodiment of the present invention provides a cam track 60 with which the diaphragm may be positively withdrawn from its seat during opening of the valve. Further with regard to this embodiment, the location of the runners 72 entirely within the grooves 66 enables the cam tracks to lie adjacent the inside bonnet surface and therefore be at maximum distance from the rotational axis.

Employment of the rollers 78 on the ends 70 of the pin 68 serves to keep at a minimum the portions of the operating force required to overcome friction.

Location of the cams at the exterior of the cylindrical member makes possible the casting of the cylindrical member with the cams integral therewith and in a finished form which requires no machining.

Arrangement of the cam surfaces so that the portions thereof have the least steepness where the diaphragm's resistance to actuation is greatest properly relates the mechanical advantage to the conditions encountered during operation and makes the operating effort substantially uniform throughout.

Provision of the adjustable bushing 34 in which stem 38 of the cylindrical member 40 is journaled enables the extreme open and closed positions of the compressor to be varied to take into account diaphragm wear and manufacturer's variations in the dimensions of the parts.

I claim:

1. In a diaphragm valve having a passage with a seat on one side thereof, having an opening on the opposite side, and having a flexible diaphragm covering said opening and clamped to the rim therearound; actuating mechanism for effecting movement of the diaphragm's unclamped center portion against the seat to close the passage and for effecting opposite movement of said center portion away from the seat to open the passage, said actuating mechanism including a cylindrical member spaced apart from the diaphragm on the side thereof opposite the seat, means supporting the cylindrical member for rotational movement about an axis passing through substantially the center of the diaphragm, opposite portions of said supporting means extending along the sides of the cylindrical member toward the ends of the seat, groove means formed on the interior surfaces of said portions and extending parallel to said rotational axis on opposite sides thereof, means forming on one end of the cylindrical member a substantially helical cam track which is substantially coaxial with said rotational axis and has its cam face presented toward the diaphragm, cam follower means disposed across said end of the cylindrical member with portions engaging said face of the cam track thereon and having its ends extending into said groove means, a diaphragm compressor carried by the cam follower means and secured to the center of the diaphragm on the side thereof opposite the seat, and opposite integral compressor portions likewise extending into the grooves, whereby rotation of the cylindrical member in one direction effects movement of the cam follower and compressor to advance the diaphragm toward the seat, the cam track formed on one side of a rib outstanding from the exterior surface of the cylindrical member, a second cam track formed on the opposite side of the rib with its face presented away from the diaphragm, the ends of the cam follower extending into the grooves carrying in the grooves means for engaging the second track to effect movement of the compressor away from the seat and withdrawal of the diaphragm therefrom when the cylindrical member is rotated in one direction.

2. In a diaphragm valve having a passage with a seat on one side thereof, having an opening on the opposite side, and having a flexible diaphragm covering said opening and clamped to the rim therearound; actuating mechanism for effecting movement of the diaphragm's unclamped center portion against the seat to close the passage and for effecting opposite movement of said center portion away from the seat to open the passage, said actuating mechanism including a cylindrical member spaced apart from the diaphragm on the side thereof opposite the seat, means supporting the cylindrical member for rotational movement about an axis passing through substantially the center of the diaphragm, opposite portions of said supporting means extending along the sides of the cylindrical member toward the ends of the seat, groove means formed on the interior surfaces of said portions and extending parallel to said rotational axis on opposite sides thereof, means forming on one end of the cylindrical member a substantially helical cam track which is substantially coaxial with said rotational axis and has its cam face presented toward the diaphragm, cam follower means disposed across said end of the cylindrical member with portions engaging said face of the cam track thereon and having its ends extending into said groove means, a diaphragm compressor carried by the cam follower means and secured to the center of the diaphragm on the side thereof opposite the seat, and opposite integral compressor portions likewise extending into the grooves, whereby rotation of the cylindrical member in one direction effects movement of the cam follower and compressor to advance the diaphragm toward the seat, the cam track formed on one side of a rib outstanding from the exterior surface of the cylindrical member, a second cam track formed on the opposite side of the rib with its face presented away from the diaphragm, the ends of the cam follower extending into the grooves carrying runners slidable therealong, and a portion of each runner extends out of its groove to overlie and engage the face of the second cam track, whereby rotation of the cylindrical member in one direction presents the second track to the overlying runner portions and moves the cam follower and compressor parallel to the rotational axis in a direction away from the seat.

3. In a diaphragm valve having a passage with a seat on one side thereof, having an opening on the opposite side, and having a flexible diaphragm covering said opening and clamped to the rim therearound; actuating mechanism for effecting movement of the diaphragm's unclamped center portion against the seat to close the passage and for effecting opposite movement of said center portion away from the seat to open the passage, said actuating mechanism including a cylindrical housing closed at one end and having its other, open end secured to the rim of the passage opening around the diaphragm's unclamped center portion, a cylindrical member located within the housing and spaced apart from the diaphragm, means mounted in the closed end of the housing supporting one end of the cylindrical member for rotation of said member about an axis passing through substantially the center of the diaphragm, a pair of grooves formed in the interior surface of the housing and extending parallel to said rotational axis on opposite sides thereof, a runner located in each groove and slidable therealong, a diaphragm compressor within the housing and spaced apart from the cylindrical member, an elongate pin connecting the runners together across the unsupported end of the cylindrical member, an operative coupling between the elongate pin and the compressor, trunnion means formed on the pin adjacent the runners and provided with rollers, runner portions extending out of the grooves toward said rotational axis and spaced apart from the rollers, an outstanding rib formation encircling the outer surface of the cylindrical member and passings between the rollers, and runner portions, the opposite sides of said rib formation engaging the rollers and the runner portions and constituting first and second circular cam tracks, respectively, which are coaxial with said rotational axis, and said rib being formed on the cylindrical member so that the cam tracks progress axially therealong between their ends a distance equal to the movement of the diaphragm's center portion from open to closed position.

4. Mechanism according to claim 3, wherein the first cam track comprises a pair of diametrically opposed identical sections each having ends spaced apart rotationally and longitudinally on the cylindrical member, wherein the ends of each section lie in planes substantially perpendicular to said rotational axis, wherein each section between its ends inclines with respect to said perpendicular planes, wherein such inclination is non-uniform between the section ends, wherein the inclination of the section approaching the end thereof nearest the diaphragm merges with this end gradually, and wherein the second cam track is formed so that the rib carrying said first cam track section fits closely between the rollers and runner portions in all positions of rotation of the cylindrical member.

5. In a diaphragm valve having a bore therethrough, a seat and a diaphragm adapted to close the valve when moved against the seat and to open the valve when moved away from said seat, a compressor connected with said diaphragm, cam follower means for moving said compressor and diaphragm relative to said seat, cam means associated with said cam follower means for effecting movement of the latter, and interconnecting means for said compressor and cam follower means for transmitting motion of one to the other, said interconnecting means being pivotally connected at one end portion to said cam follower means along one pivotal axis and at its other end portion pivotally connected to said compressor along an axis substantially perpendicular to said one pivotal axis.

6. In a diaphragm valve having a passage with a seat on one side thereof, having an opening on the opposite side, and having a flexible diaphragm covering said opening and clamped to the rim therearound; actuating mechanism for effecting movement of the diaphragm's unclamped center portion against the seat to close the passage and for effecting opposite movement of said center portion away from the seat to open the passage, said actuating mechanism including a cylindrical member on the side of the diaphragm opposite the seat, means supporting the cylindrical member for rotational movement about an axis passing through substantially the center of the diaphragm, fixed guides formed on the interior surface of said supporting means and extending parallel to said rotational axis on opposite sides thereof, a substantially helical cam track formed on one end of the cylindrical member which is substantially coaxial with said rotational axis and has its cam face presented toward the diaphragm, a cam follower disposed across said end of the cylindrical member with portions engaging said face of the cam track thereon and having its ends slidably engaging said fixed guides, a diaphragm compressor carried by the cam follower and secured to the center of the diaphragm on the side thereof opposite the seat, and opposite integral compressor portions likewise slidably engaging said fixed guides, whereby rotation of the cylindrical member in one direction effects movement of the cam follower and compressor to advance the diaphragm toward the seat, a rib outstanding from the surface of the cylindrical member, a second cam track formed on one side of the rib with its face presented away from the diaphragm, said cam follower ends carrying means engaging the second cam track to effect movement of the compressor away from the seat and withdrawal of the diaphragm therefrom when the cylindrical member is rotated in the other direction.

7. In a diaphragm valve having a passage with a seat on one side thereof and having a flexible diaphragm clamped around an opening on the opposite side whereby the passage may be closed upon movement of the diaphragm's unclamped center portion inwardly against the seat, actuating mechanism for effecting said diaphragm movement which includes a cylindrical member, fixed means supporting the cylindrical member for rotational movement about an axis passing through substantially the center of diaphragm, a cam track formed around the cylindrical member and extending part way therealong in a direction parallel to said rotational axis, said cam track having its face presented toward the diaphragm, fixed guides exterior to the cylindrical member and parallel to said rotational axis, a diaphragm compressor adjacent the diaphragm on the side thereof opposite the seat, and an operative coupling between the compressor and the guides, said coupling having portions engaging the cam track whereby rotation of the cylindrical member in one direction effects movement of the compressor only along said rotational axis to move the diaphragm inwardly against the seat, and wherein a second cam track is formed around the cylindrical member and extends part way therealong in a direction parallel to said rotational axis, wherein said second cam track has its face presented away from the diaphragm, wherein the coupling carries means for engaging the second cam track to effect movement of the compressor away from the diaphragm along said rotational axis when the cylindrical member is rotated, and wherein the diaphragm is secured to the compressor so as to be moved therewith.

8. In a diaphragm valve having a passage with a seat on one side thereof, having an opening on the opposite side, and having a flexible diaphragm covering said opening and clamped to the rim therearound; actuating mechanism for effecting movement of the diaphragm's unclamped center portion against the seat to close the passage and for effecting opposite movement of said center portion away from the seat to open the passage, said actuating mechanism including a cylindrical member on the side of the diaphragm opposite the seat, means supporting the cylindrical member for rotational movement about an axis passing through substantially the center of the diaphragm, fixed guides formed on the interior surface of said supporting means and extending parallel to said rotational axis on opposite sides thereof, a substantially helical cam track formed on one end of the cylindrical member which is substantially coaxial with said rotational axis and has its cam face presented toward the diaphragm, a cam follower disposed across said end of the cylindrical member with portions engaging said face of the cam track thereon and having its ends slidably engaging said fixed guides, a diaphragm compressor carried by the cam follower and secured to the center of the diaphragm on the side thereof opposite the seat, and opposite integral compressor portions likewise slidably engaging said fixed guides, whereby rotation of the cylindrical member in one direction effects movement of the cam follower and compressor to advance the diaphragm toward the seat, a second cam track formed on the cylindrical member and facing opposite to the diaphragm and the ends of the cam follower which slidably engage the fixed guides carry portions which engage the face of the second cam track to thereby positively effect movement of the compressor when the cylindrical member is rotated in either direction.

9. In a diaphragm valve having a passage with a seat on one side thereof, having an opening on the opposite side, and having a flexible diaphragm covering said opening and clamped to the rim therearound; actuating mechanism for effecting movement of the diaphragm's unclamped center portion against the seat to close the passage and for effecting opposite movement of said center portion away from the seat to open the passage, said actuating mechanism including a cylindrical member on the side of the diaphragm opposite the seat, means supporting the cylindrical member for rotational movement about an axis passing through substantially the center of the diaphragm, fixed guides formed on the interior surface of said supporting means and extending parallel to said rotational axis on opposite sides thereof, a substantially helical cam track formed on one end of the cylindrical member which is substantially coaxial with said rotational axis and has its cam face presented toward the diaphragm, a cam follower disposed across said end of the cylindrical member with portions engaging said face of the cam track thereon and having its ends slidably engaging said fixed guides, a diaphragm compressor carried by the cam follower and secured to the center of the diaphragm on the side thereof opposite the seat, and opposite integral compressor portions likewise slidably engaging said fixed guides, whereby rotation of the cylindrical member in one direction effects movement of the cam follower and compressor to advance the diaphragm toward the seat, the means for supporting the cylindrical member being adjustable along the rotational axis thereof to change the location of the compressor in the closed position.

References Cited in the file of this patent

UNITED STATES PATENTS

| | | |
|---|---|---|
| 1,156,010 | Kenney | Oct. 5, 1915 |
| 1,365,694 | Jernstedt | Jan. 18, 1921 |
| 2,096,528 | Saunders | Oct. 19, 1937 |
| 2,283,369 | Jacobsen | May 19, 1942 |
| 2,579,982 | Trump | Dec. 25, 1951 |

FOREIGN PATENTS

| | | |
|---|---|---|
| 144,524 | Australia | 1952 |